US012727551B2

(12) United States Patent
Hart et al.

(10) Patent No.: US 12,727,551 B2
(45) Date of Patent: Sep. 8, 2026

(54) TRAY ASSEMBLIES FOR USE WITH SEEDS, AND RELATED METHODS

(71) Applicant: MONSANTO TECHNOLOGY LLC, Saint Louis, MO (US)

(72) Inventors: Bradley Douglas Hart, Tucson, AZ (US); Huachun Larue, Chesterfield, MO (US); Ryan Ann Mertz, Tucson, AZ (US); Ursula Ruiz Vera, Tucson, AZ (US); Ryan Keith Tellor, Tucson, AZ (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 0 days.

(21) Appl. No.: 18/913,166

(22) Filed: Oct. 11, 2024

(65) Prior Publication Data

US 2025/0120346 A1 Apr. 17, 2025

Related U.S. Application Data

(60) Provisional application No. 63/543,844, filed on Oct. 12, 2023.

(51) Int. Cl.
*A01G 9/029* (2018.01)

(52) U.S. Cl.
CPC ......... *A01G 9/0293* (2018.02); *A01G 9/0295* (2018.02); *A01G 9/0299* (2018.02)

(58) Field of Classification Search
CPC .......... A01G 9/026; A01G 9/028; A01G 9/02; A01G 9/0293; A01G 9/0299; A01G 9/0295; A01C 1/04; A01C 1/00
USPC .............................. 47/66.7, 66.4, 66.3, 66.1
See application file for complete search history.

(56) References Cited

U.S. PATENT DOCUMENTS

| | | | | |
|---|---|---|---|---|
| 4,072,251 | A * | 2/1978 | Huang | A01C 7/04 222/361 |
| 4,771,912 | A | 9/1988 | van Wingerden | |
| 5,974,734 | A * | 11/1999 | Eastin | A01B 79/00 47/58.1 |
| 10,477,778 | B2 * | 11/2019 | Vezina | A01G 9/02 |
| 12,285,389 | B2 * | 4/2025 | Jochemsen | A61J 7/02 |
| 2006/0048247 | A1 | 3/2006 | Deppermann | |
| 2014/0065661 | A1 | 3/2014 | Baumgartner et al. | |

(Continued)

FOREIGN PATENT DOCUMENTS

| | | | | |
|---|---|---|---|---|
| AT | 17852 U1 * | 5/2023 | | A47G 7/04 |
| CN | 216313852 U * | 4/2022 | | A01C 1/00 |

*Primary Examiner* — Carly W. Lynch
(74) *Attorney, Agent, or Firm* — Harness, Dickey & Pierce, P.L.C.

(57) ABSTRACT

Tray assemblies are provided for use in treating and planting batches of seeds. In one example embodiment, a tray assembly includes a first tray and a second tray configured to couple to the first tray. The first tray includes multiple wells each configured to receive a seed. And, the second tray includes multiple openings configured to align with the wells of the first tray when the second tray is coupled to the first tray. The tray assembly also includes a first divider positioned between the first tray and the second tray, and a second divider coupled to the first tray. The first divider is configured to allow selective movement of seeds from the openings of the second tray to the wells of the first tray, and the second divider is configured to allow selective movement of seeds out of the wells of the first tray.

8 Claims, 14 Drawing Sheets

(56) References Cited

U.S. PATENT DOCUMENTS

| | | | |
|---|---|---|---|
| 2014/0338578 | A1 | 11/2014 | Pratt et al. |
| 2020/0000007 | A1 | 1/2020 | Barrick et al. |
| 2022/0015304 | A1 | 1/2022 | Bailey et al. |

* cited by examiner

TRAY ASSEMBLIES FOR USE WITH SEEDS, AND RELATED METHODS

CROSS-REFERENCE TO RELATED APPLICATION

This application claims the benefit of, and priority to, U.S. Provisional Application No. 63/543,844, filed on Oct. 12, 2023. The entire disclosure of the above-referenced application is incorporated herein by reference.

FIELD

The present disclosure generally relates to tray assemblies for use with seeds (e.g., batches of seeds, etc.), and methods relating thereto. In particular, example embodiments of the present disclosure generally relate to tray assemblies for use in batch handling and/or treatment of seeds (e.g., soaking, priming, bio stimulant application, sterilizing agent application, etc.) and then planting of the seeds (e.g., in a lab setting for planting and evaluating/testing seeds and/or plants germinated therefrom, etc.), and methods relating thereto, while being capable of maintaining single seed identity of the seeds.

BACKGROUND

This section provides background information related to the present disclosure which is not necessarily prior art.

Seeds are often planted and grown in controlled settings (e.g., in labs, etc.) to determine, for example, viability, vigor, etc. of the seeds based on how well the seeds grow after planting. In connection with the planting, seed priming (e.g., generally controlled seed soaking and hydration, etc.) is often used to accelerate germination by activating seed metabolism through a hydration process, thereby increasing the vigor of the plant.

SUMMARY

This section provides a general summary of the disclosure, and is not a comprehensive disclosure of its full scope or all of its features.

Example embodiments of the present disclosure generally relate to tray assemblies for use in treating (e.g., incubating, priming, sterilizing, etc.) and planting seeds (e.g., batches of seeds while also being capable of maintaining single seed identity of the seeds through such treating and planting operations, etc.). In one example embodiment, such a tray assembly generally includes a first tray comprising multiple wells extending through the first tray, each of the multiple wells configured to receive a seed; a second tray configured to couple to the first tray, the second tray including multiple openings extending through the second tray, the openings of the second tray configured to align with the wells of the first tray when the second tray is coupled to the first tray; a first divider positioned between the first tray and the second tray, the first divider moveable relative to the first tray and the second tray to allow selective movement of seeds from the openings of the second tray to the wells of the first tray; and a second divider coupled to the first tray, the second divider moveable relative to the first tray to allow selective movement of seeds out of the wells of the first tray.

Example embodiments of the present disclosure also generally relate to methods of treating (e.g., incubating, priming, sterilizing, etc.) and planting seeds (e.g., batch planting of seeds while maintaining single seed identity of the seeds through such treating and planting operations, etc.). In one example embodiment, such a method generally includes positioning multiple seeds (e.g., as part of a batch of seeds, etc.) in a tray assembly via an automated seed planting system (e.g., to assign single seed identity to each of the seeds, to contain the seeds, to facilitate processing of the seeds, etc.); after positioning the multiple seeds in the tray assembly, incubating and/or treating (e.g., priming, etc.) the seeds while the seeds are in the tray assembly; and then transferring the seeds from the tray assembly to a germination tray, thereby planting the seeds in the germination tray (e.g., while being capable of maintaining single seed identity of the seeds, etc.).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
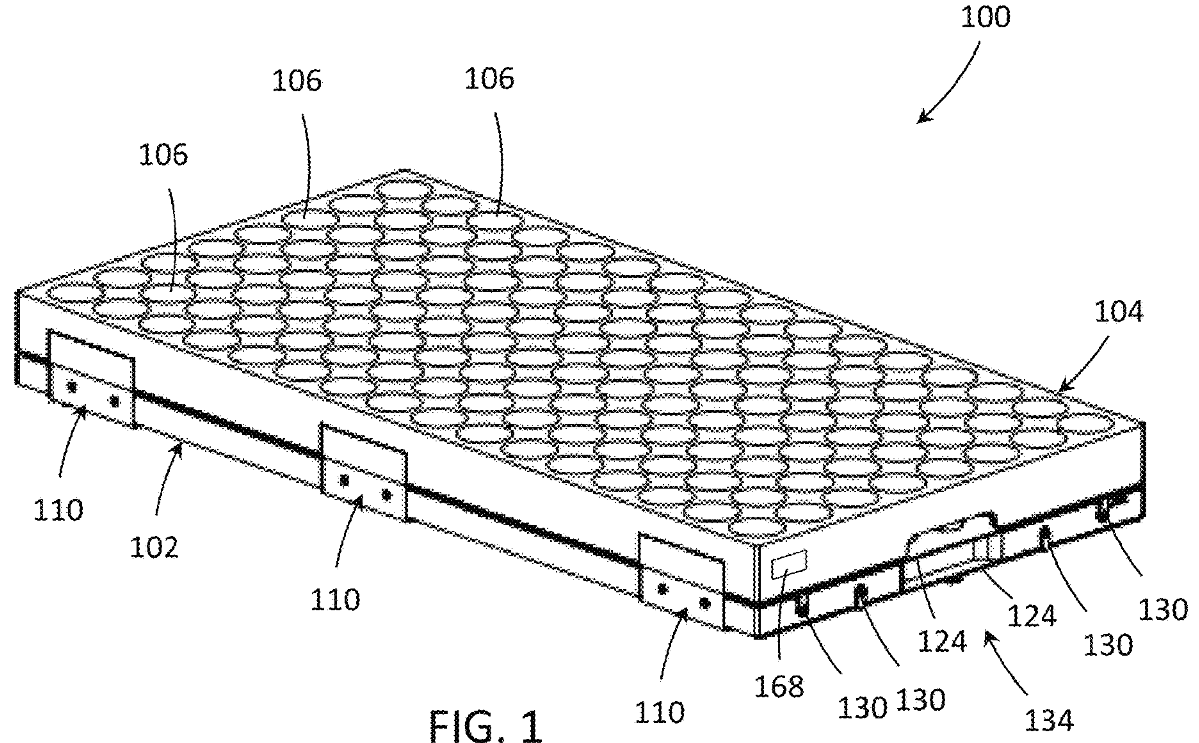
FIG. 1 is a perspective view of an example embodiment of a tray assembly of the present disclosure.

Example embodiments will now be described more fully with reference to the accompanying drawings. The description and specific examples included herein are intended for purposes of illustration only and are not intended to limit the scope of the present disclosure.

In preparation for planting and growing seeds, it may be desired to prime (broadly, treat, incubate, etc.) the seeds to accelerate germination, increase vigor in the resulting plants, and/or manage seed-borne pathogens. In doing so, the seeds are typically soaked and/or hydrated in a solution containing water, biostimulants (or other micronutrients) (e.g., an oxidate solution, etc.), and/or a sterilizing agent, etc. for a time interval (or duration), and then dried to achieve a desired moisture content (e.g., a moisture content just below that required for radicle emergence, etc.). The dried seeds may then be planted and grown. Or, the seeds may be directly drained (e.g., without drying, etc.), and then planted and grown.

In connection with the above, tray assemblies and related methods are provided herein for use in connection with priming seeds (broadly, treating the seeds) (e.g., incubating, soaking, hydrating, etc. the seeds) and then germinating the seeds. The tray assemblies may be implemented in a manual system for placing/planting seeds, or in an automated system for placing/planting and evaluating seeds, such as in the system described in Applicant's U.S. Pat. Appl. Publ. No. 2020/0000007 or in the system described in Applicant's U.S. Pat. Appl. Publ. No. 2022/0015304, both of which are incorporated herein by reference in their entirety. In various examples, the tray assemblies provide for batch processing of large quantities of seeds (e.g., in an automated manner, etc.), where seed identity can be assigned and single seed identity of the processed seeds may be maintained. The tray assemblies also provide for improved efficiency in priming of the seeds and overall improvement in quality and efficiency of batch seed processing operations; and further provide for single seed manipulation of seeds in such batch processes, as needed or desired (e.g., during seed preparation, seed analysis, etc.), while having the capability of maintaining single seed identity of the seeds in the batches. In addition, such priming of the seeds via the tray assemblies herein, in preparation for growing the seeds, may provide improved efficiency in such priming operations and, further, may increase vigor of the resulting plants grown from the seeds by accelerating the germination rate of the seeds and by managing (e.g., controlling, inhibiting, etc.) seed-borne pathogens (e.g., resulting in improved survival rates, seed quality, etc.). As such, through the tray assemblies herein, improved germination of seeds may be achieved as well as improved quality of the resulting seeds and, thus, overall reliability and efficiency of seed production and manufacturing processes associated therewith (e.g., that make use of the tray assemblies herein, etc.).

That said, in some examples, individual seeds may be genotyped and selected based on their genetics prior to priming and planting. In such instances, the tray assemblies and related methods provided herein allow for processing batches of such seeds while also maintaining single seed identity of the seeds. In doing so, the batches of seeds may be primed as desired and then subsequently planted and grown, with the identity of each seed known (e.g., based on location within the tray assemblies, etc.) such that the plants grown from the seeds may subsequently be identified back to the seeds having the particular genetics, etc. (thereby reducing human-related (or subjective) errors in managing such seed identity). What's more, the tray assemblies and related methods provided herein allow for doing so (i.e., allow for maintaining single seed identity while processing the seeds) on a batch scale to additionally provide operational efficiency in managing large numbers of seeds.

FIGS. 1-6 illustrate an example embodiment of a tray assembly 100 including one or more aspects of the present disclosure. The tray assembly 100 may be used in connection with the automated priming (broadly, automated treating and/or incubating) and planting of seeds, for example, for growing the seeds and evaluating plants grown from the seeds, etc. In connection therewith, in various examples, the tray assembly 100 (or multiple ones of the tray assembly 100) is/are configured for use in batch handling of the seeds (e.g., priming and planting batches of seeds, etc.) while also maintaining single seed identity of the seeds in the batch (so that each seed can subsequently be identified (e.g., before, during or after treatment; before, during or after planting; before, during or after germination; etc.), as desired.

Figure 2:
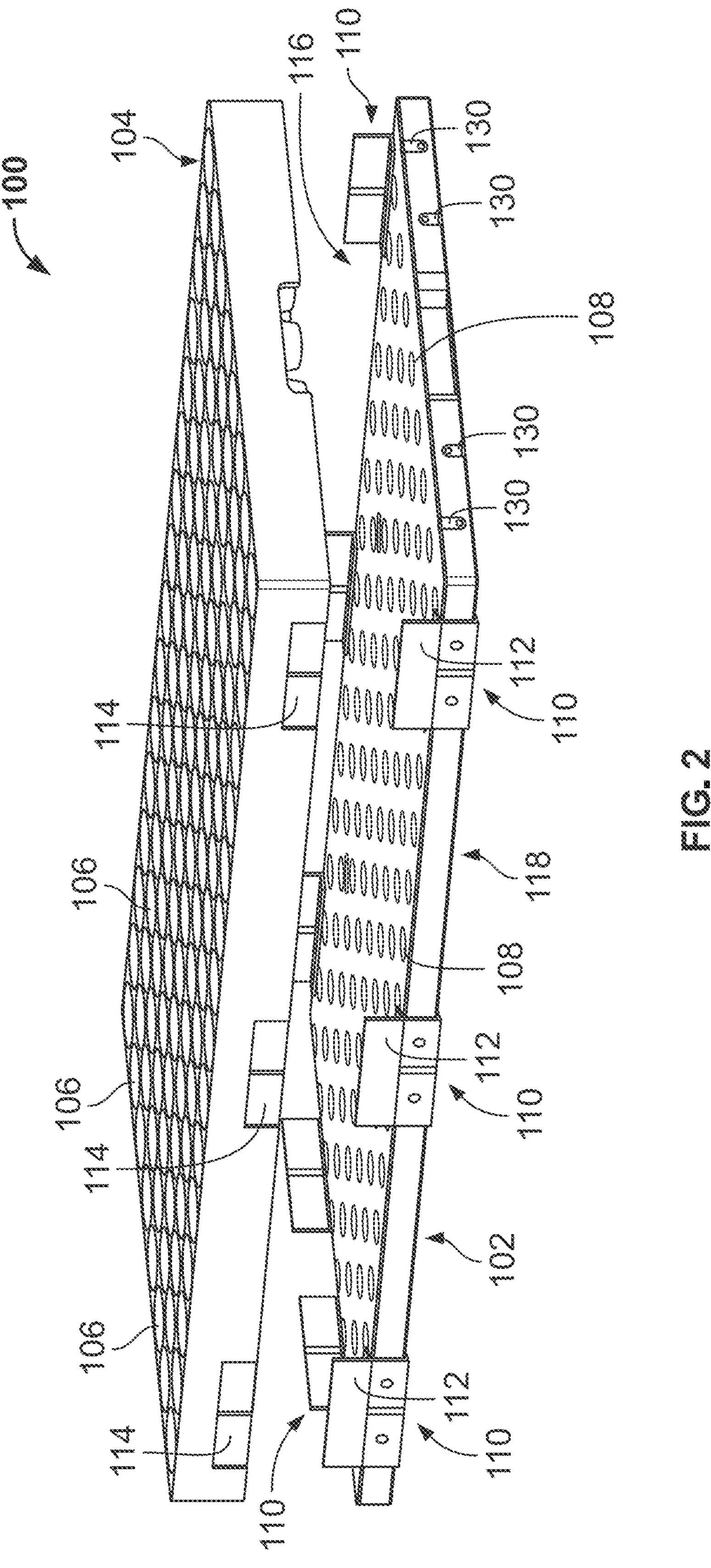
FIGS. 2 and 3 are exploded perspective views of the tray assembly of FIG. 1, illustrating a staging tray and a priming tray of the tray assembly.
Figure 3:
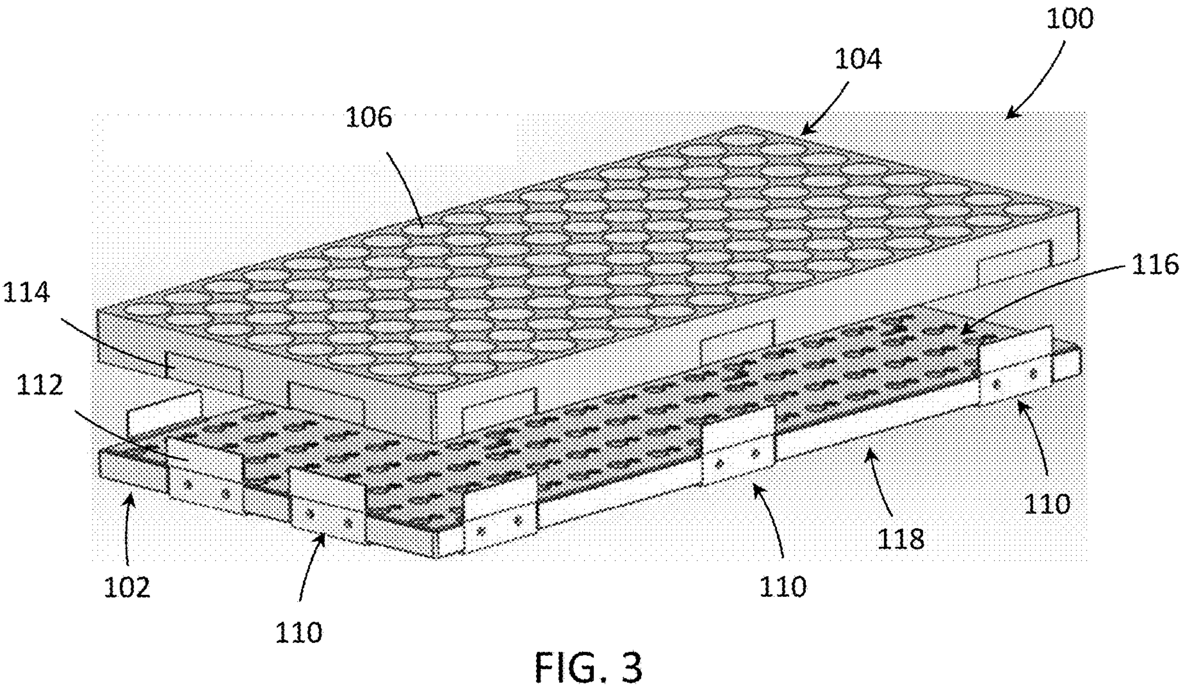

As shown in FIGS. 1-3, the tray assembly 100 generally includes a priming tray 102 (e.g., a seed treatment tray, an incubating tray, etc.) (broadly, a first tray or a holding tray) and a staging tray 104 (broadly, a second tray) disposed, positioned, located, etc. generally on (or above or over) the priming tray 102. The staging tray 104 is configured to be removably positioned over the priming tray 102, such that the staging tray 104 may be removed from the priming tray 102 as desired (see, e.g., FIGS. 2 and 3, etc.) (e.g., in connection with planting seeds from the priming tray 102, etc.).

The staging tray 104 is configured to receive seeds into the tray assembly 100, for example, from an automated seed placement system (as will be described more hereinafter), and then guide, direct, deliver, etc. the received seeds to the priming tray 102. The staging tray 104 includes multiple openings 106 (e.g., passages, holes, etc.) that extend through the staging tray 104. And, each of the openings 106 is configured to receive a single seed from the automated seed placement system. In connection therewith, the priming tray 102 includes multiple wells 108 configured to receive the seeds from the staging tray 104. When the staging tray 104 is positioned on the priming tray 102, each of the openings 106 of the staging tray 104 generally aligns with one of the wells 108 of the priming tray 102. As such, the openings 106 of the staging tray 104 are configured to guide, direct, etc. the seeds received in the staging tray 104 into corresponding aligned wells 108 of the priming tray 102. In this way, each of the wells 108 of the priming tray 102 is configured to receive a single seed from the staging tray 104. That said, while the tray assembly 100 is described above (and generally herein) as receiving seeds from an automated seed placement system, it should be appreciated that the tray assembly 100 may receive seeds via other systems or manually in other examples (e.g., seeds may be manually placed in the openings of the staging tray 104, etc.).

The openings 106 of the staging tray 104 may have any desired shape. For instance, in the illustrated embodiment, the openings 106 have generally cylindrical shapes. Alternatively, the openings 106 may have generally conical shapes (such that the openings 106 generally taper inward as they extend downward through the staging tray 104 and provide a funnel feature, etc.).

The staging tray 104 is configured to couple to the priming tray 102 when positioned on the priming tray 102, to facilitate alignment of the openings 106 of the staging tray 104 with corresponding wells 108 of the priming tray 102 and to provide accurate receipt of the seeds from the staging tray 104 into the priming tray 102. To do so, the priming tray 102 includes latches 110 configured to retain the staging tray 104 on the priming tray 102 and align the openings 106 of the staging tray 104 with the wells 108 of the priming tray 102. In the illustrated embodiment, the latches 110 are attached to the priming tray 102 (e.g., via mechanical fasteners, etc.). And, each of the latches 110 includes a sidewall 112 extending generally upward from the priming tray 102 (e.g., generally vertically upward, etc.). The staging tray 104 then includes multiple recesses 114 defined in sidewalls thereof. When the staging tray 104 is coupled to the priming tray 102, the recesses 114 of the staging tray 104 are configured to receive the sidewalls 112 of the latches 110 of the priming tray 102 to thereby position, secure, etc. the staging tray 104 on the priming tray 102 (e.g., for receiving seeds into the tray assembly 100, etc.) in the desired, appropriate, etc. arrangement.

Figures 4, 5:
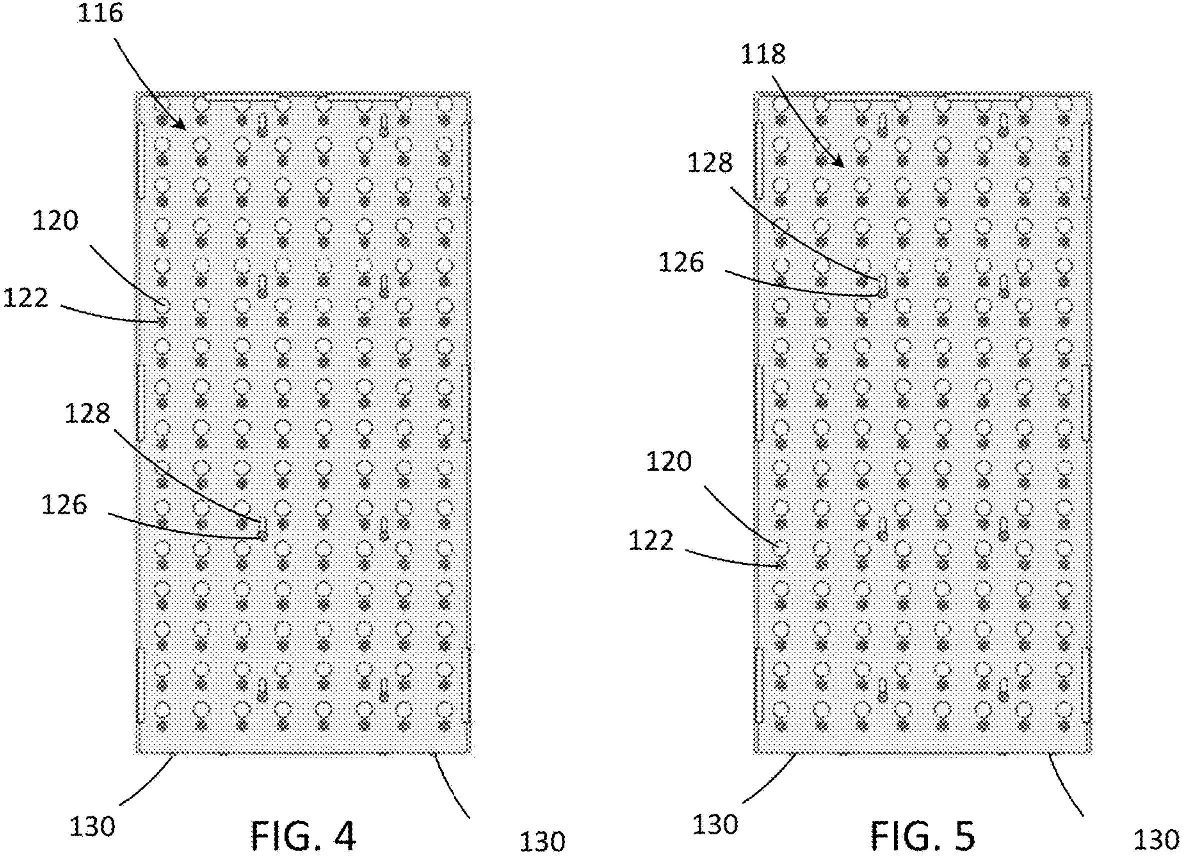
FIG. 4 is a top plan view of the priming tray of the tray assembly of FIG. 1.
FIG. 5 is a bottom plan view of the priming tray of the tray assembly of FIG. 1.

With additional reference to FIGS. 4 and 5, the tray assembly 100 also includes two dividers 116, 118 positioned to generally above and below the priming tray 102. In particular, a first divider 116 (or upper divider) is positioned on an upper surface of the priming tray 102 (generally between the priming tray 102 and the staging tray 104), and a second divider 118 (or lower divider) is positioned on a lower surface of the priming tray 102. As will be described, the dividers 116, 118 are configured to selectively retain the seeds received in the priming tray 102 within the wells 108 of the priming tray 102, or release the seeds therefrom (or inhibit seeds from entering the wells 108 of the priming tray 102, as desired).

Each of the dividers 116, 118 includes multiple pairs of openings configured to selectively align with corresponding wells 108 of the priming tray 102. In addition, the pairs of openings of the first divider 116 are also configured to selectively align with corresponding openings 106 of the staging tray 104 (when the staging tray 104 is coupled to the priming tray 102). In the illustrated embodiment, each pair of openings of the first and second dividers 116, 118 includes a cutout opening 120 and perforated (or meshed) opening 122. In connection therewith, the cutout opening 120 is configured to allow a seed to move into and out of a corresponding well 108 of the priming tray 102. And, the perforated opening 122 is configured to retain the seed in the corresponding well 108 of the priming tray 102 (and/or inhibit a seed from entering a well 108 of the priming tray 102, for example, from a corresponding opening 106 of the staging tray 104) while also allowing fluid (e.g., priming fluid, etc.) (broadly, treatment fluid or treatment) to freely flow into and out of the well 108 (with the seed therein) (e.g., water, a priming solution, a bio-stimulant solution, a nutrient solution, and/or a biocontrol solution, etc.).

Figure 6:
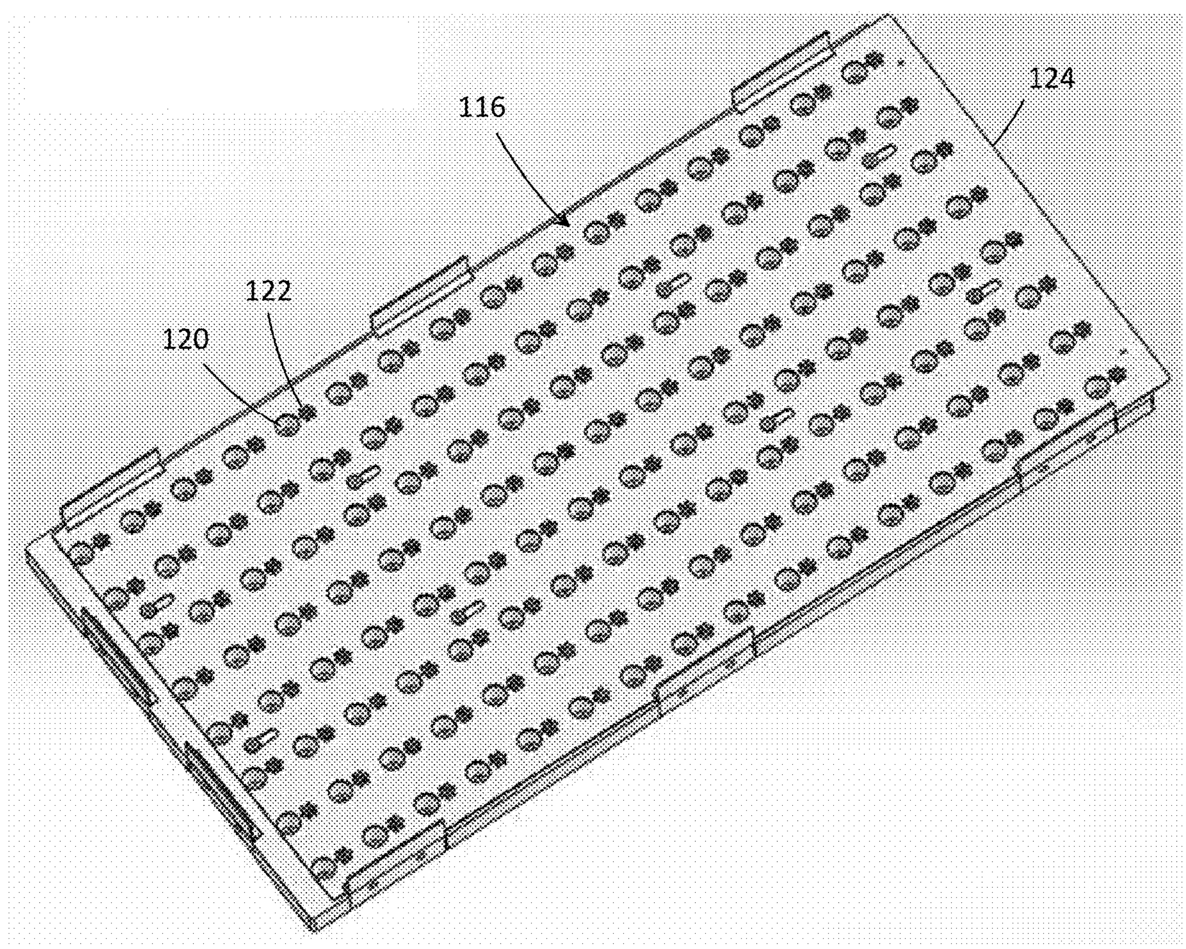
FIG. 6 is an upper perspective view of the priming tray of the tray assembly of FIG. 1, with a divider of the tray assembly illustrated in an open position.

With further reference to FIG. 6, the dividers 116, 118 are moveably coupled to the priming tray 102. As such, as desired, end portions 124 (FIG. 1) of the dividers may be grasped (e.g., manually, by an automated robot, etc.) to thereby move (e.g., slide, etc.) the dividers 116, 118 relative to the priming tray 102 to selective align either the cutout openings 120 or the perforated openings 122 with the wells 108 of the priming tray 102. In particular, in the illustrated embodiment, the dividers 116, 118 are each coupled to the priming tray 102 by pins 126 (e.g., pins 126 extending through the priming tray 102 and coupling the first and second dividers 116, 118 to the corresponding upper and lower surfaces of the priming tray 102, etc.). The pins 126 are then aligned in slots 128 of the dividers 116, 118 to allow the sliding movement of the dividers 116, 118 relative to the priming tray 102. In addition, locks are provided to secure the dividers 116, 118 in the desired position (e.g., spring-loaded locking pins 130 configured to extend outward and block sliding movement of the dividers 116, 118 when the dividers 116, 118 are each moved to a locking position (e.g., a closed position, a position in which the perforated openings 122 are aligned with the wells 108 of the priming tray 102, etc.), etc.).

Figure 7:
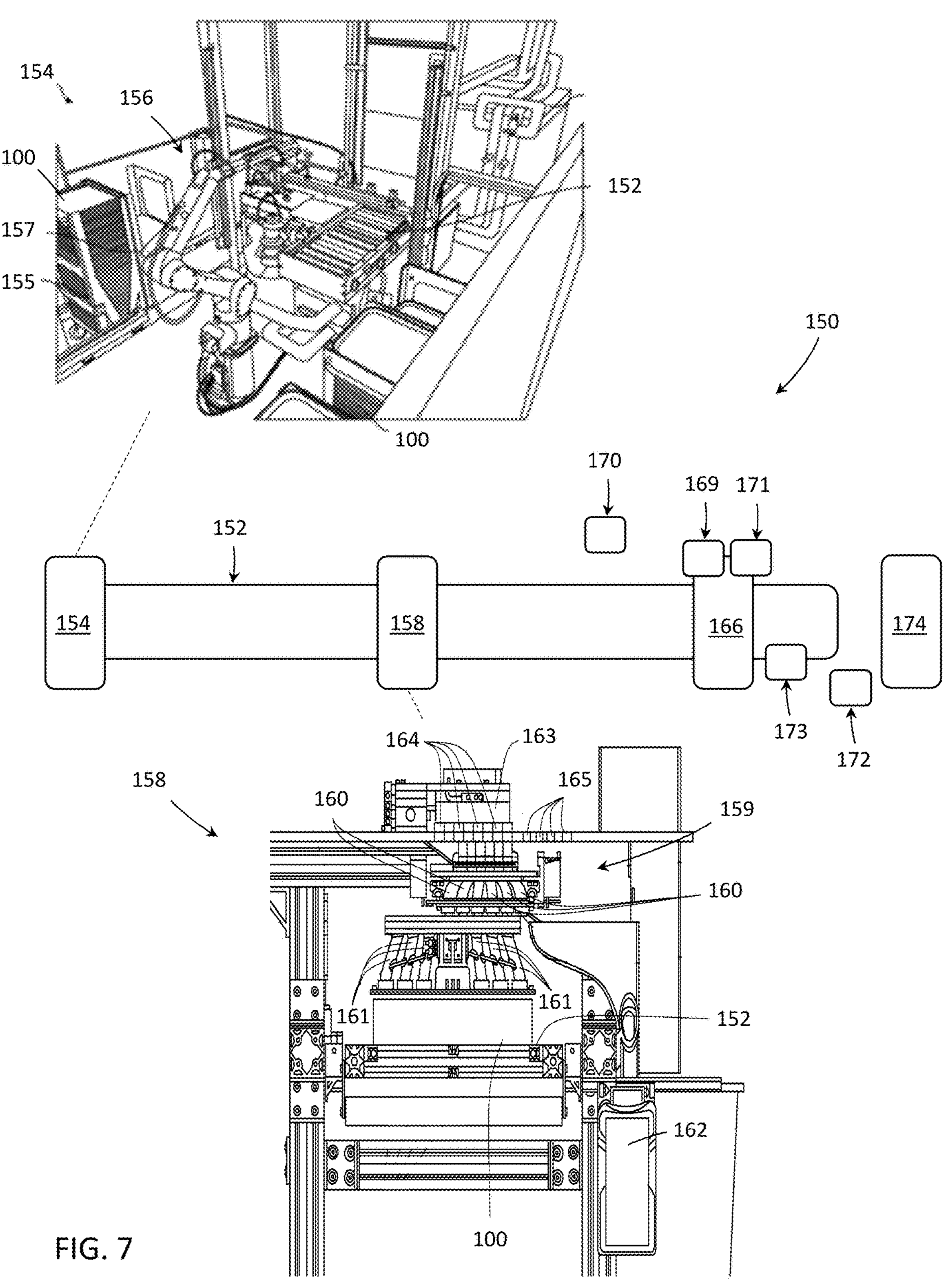
FIG. 7 is a schematic illustration of an automated seed placement system in which the tray assembly of FIG. 1 may be used.

FIG. 7 illustrates an example embodiment of an automated seed placement/handling system 150 with which the tray assembly 100 of the present disclosure may be used. In connection with such use, the staging tray 104 of the tray assembly 100 is coupled to the priming tray 102, via the latches 110. And, the first and second dividers 116, 118 are both moved to a closed (or locking) position, in which the perforated openings 122 are aligned with the wells 108 of the priming tray 102 and the locking pins 130 are engaged to inhibit sliding movement of the dividers 116, 118. The system 150, then, is configured to deposit seeds having a known identity (e.g., at least one known genotypic and/or phenotypic characteristic or trait, etc.) into the tray assembly 100, while also tracking the identity of each seed throughout the process (e.g., from receipt of the seeds into the system 150 through deposition of the seeds into the tray assembly 100 and to priming and germination of the seeds, etc.).

In an example operation of the automated system 150, using the tray assembly 100 of the present disclosure, the tray assembly 100 is initially positioned on a conveyor 152 of the system 150 at a tray loading station 154. This may be done in a manual manner (e.g., by a user at the tray loading station 154, etc.) or in an automated manner (e.g., via a robot, etc.). For instance, in the illustrated embodiment, the tray assembly 100 (once prepared as described above) is positioned in a cart 155 at the tray loading station 154, and a robot 156 of the system 150 is configured to transfer (in an automated manner) the tray assembly 100 from the cart 155 to the conveyor 152. In particular, an arm 157 of the robot 156 is configured to engage a receptacle 134 (see, FIG. 1) of the tray assembly 100, and remove the tray assembly 100 from the cart 155. The robot 156 is configured to then position the tray assembly 100 on the conveyor 152. In turn, the conveyor 152 is configured to move the tray assembly 100 from the tray loading station 154 to a seed placement assembly 158 of the system 150, which is configured to then deliver seeds to the tray assembly 100 (as described next).

The seed placement assembly 158, in this example embodiment, includes a seed delivery unit 159 comprising multiple groupings of tubes (or conduits, or pathways) 160, 161 arranged to collect and deliver seeds to the tray assembly 100, for example, from either a bulk supply 162 of seeds, or from seed a storage tray 163, etc. For instance, staging tubes 160 of the seed delivery unit 159 are configured to move within the seed placement assembly 158 to collect seeds from either the seed storage tray 163 (via funnels 164) or from the bulk supply 162 (via openings 165 and one or more conduits (not shown) extending from the bulk supply 162 to the openings 165 to thereby deliver the seeds to the openings 165). In doing so, the delivery unit 159 is configured to align the staging tubes 160 with either the funnels 164 (to receive the seeds from the seed storage tray 163) or the openings 165 (to receive the seeds from the bulk supply 162). Once the seeds are collected (from either source), the delivery unit 159 is configured to move the staging tubes 160 into alignment with delivery tubes 161 and release the collected seeds into the delivery tubes 161. The delivery tubes 161, then, are configured to direct the seeds to the tray assembly 100. As such, as the tray assembly 100 passes under the seed placement assembly 158, the delivery tubes 161 are configured to align with the openings 106 of the staging tray 104 of the tray assembly 100 (e.g., a row of the openings 106, etc.) and then selectively actuate (e.g., open a gate, etc.) to deliver (e.g., release, etc.) seeds to the tray assembly 100. As the seeds are released, they move into the openings 106 of the staging tray 104 such that one seed is received in each of the openings 106. However, because the first divider 116 of the tray assembly 100 is in the closed (or locking) position, the seeds remain in the openings 106 of the staging tray 104 and generally rest on the perforated openings 122 of the first divider 116 (e.g., the perforated openings 122 of the first divider 116 generally inhibit the seeds from passing to the priming tray 102, etc.).

After receiving the seeds into the staging tray 104, the conveyor 152 of the system 150 is configured, in this example embodiment, to move the tray assembly 100 to a verification station 166. At the verification station 166, a tray ID 168 (FIG. 1) of the tray assembly 100 may be read by a sensor 169 and communicated to a controller 170 to confirm, track, etc. movement of the tray assembly 100 through the system 150 and to generally correspond the seeds received into the tray assembly 100 (at the seed placement assembly 158) with the particular tray assembly 100 (e.g., to facilitate tracking the identity of each seed throughout the process, etc.). The tray assembly 100 may then also be imaged with a camera of an imaging system 171 to confirm proper placement of seeds (e.g., single seeds, etc.) in the openings 106 in the staging tray 104, etc.

Figure 8:
FIG. 8 is a perspective view of the priming tray of the tray assembly of FIG. 1 included in a stacked arrangement with multiple other priming trays.

The tray assembly 100 is then removed from the conveyor 152 and collected for seed priming, for example, at a work station 172, etc. (e.g., manually, in an automated manner by a robot 173 similar to robot 156, etc.). In doing so, at the work station 172, the first divider 116 is actuated (e.g., the locking pins 130 are depressed to allow sliding movement of the divider 116, etc.) and moved to an open position, to align the cutout openings 120 with the wells 108 of the priming tray 102. And, in response, the seeds in the openings 106 of the staging tray 104 are released into the corresponding (aligned) wells 108 of the priming tray 102 (though the cutout openings 120 of the divider 116) and are retained in the wells 108 by the second divider 118 (which is maintained in the closed or locking position). The first divider 116 is then moved back to the closed (or locking) position, with the perforated openings 122 again covering the wells 108 of the priming tray 102. The seeds received from the seed placement system 150 are now retained within the wells 108 of the priming tray 102. And, the staging tray 104 is removed from the priming tray 102 (e.g., by disengaging the staging tray 104 from the latches 110 of the priming tray 102, etc.), and the priming tray 102 is positioned (e.g., stacked as shown in FIG. 8, etc.) with other priming trays in preparation for seed priming.

In connection with the seed priming, the priming tray 102 (e.g., the stack of priming trays, etc.) is positioned within a container 174 (e.g., a storage unit, etc.) filled with a desired priming fluid (e.g., an oxidate solution, etc.) (broadly, a treatment fluid or solution) (e.g., a liquid treatment, etc.) and incubated in the priming fluid for a desired period of time (e.g., about one hour, about two hours, about four hours, about eight hours, more than about eight hours, etc.). In doing so, the priming tray 102 may be at least partly submerged within the priming fluid in the container 174. The container 174 may be located in, or may define, a controlled environment, for example, such that the priming tray 102 is at a desired temperature (e.g., about 28° C. or more or less, etc.) and at a desired relative humidity (e.g., about 65% or more or less, etc.). Once the seeds are incubated in the priming fluid for the desired period of time, the priming tray 102 is removed from the container 174, the priming fluid is drained from the priming tray 102 (via the perforated openings 122 of the dividers 116, 118), and the seeds (in the priming tray 102) are incubated once again for another period of time (e.g., up to about eight hours, about ten hours, about sixteen hours, about twenty hours, more than about twenty hours, etc.). Such incubation may also take place in a controlled environment, for example, similar to the controlled environment described above with regard to seed priming. In this example embodiment, because of the perforated openings 122 of the first and second dividers 116, 118 are aligned with the wells 108 of the priming tray 102, the priming fluid readily drains from the wells when the priming tray 102 is removed from the priming fluid. As such, in this example embodiment, additional (active) drying of the seeds is not required prior to second, further incubation of the seeds.

Figure 9:
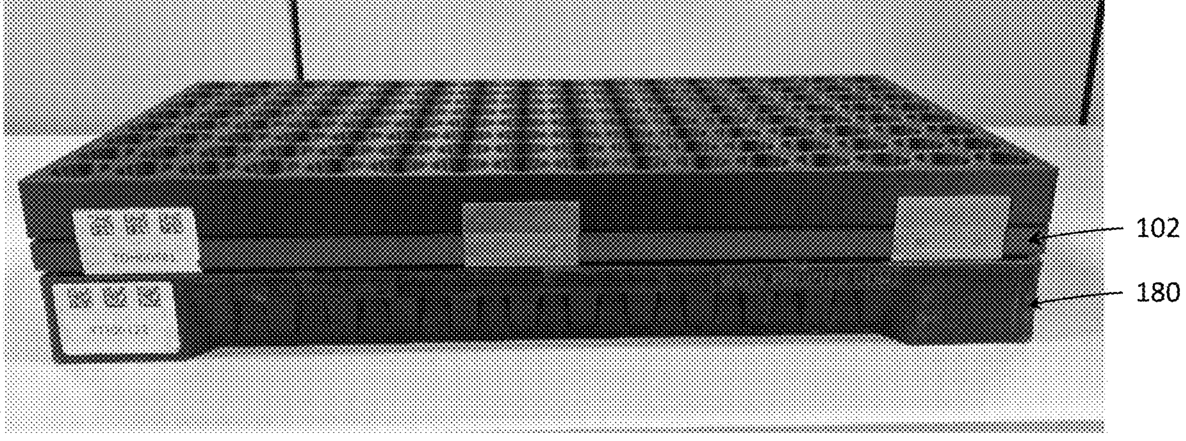
FIG. 9 is a perspective view of the tray assembly of FIG. 1 shown in relation to a germination tray.
Figure 10:
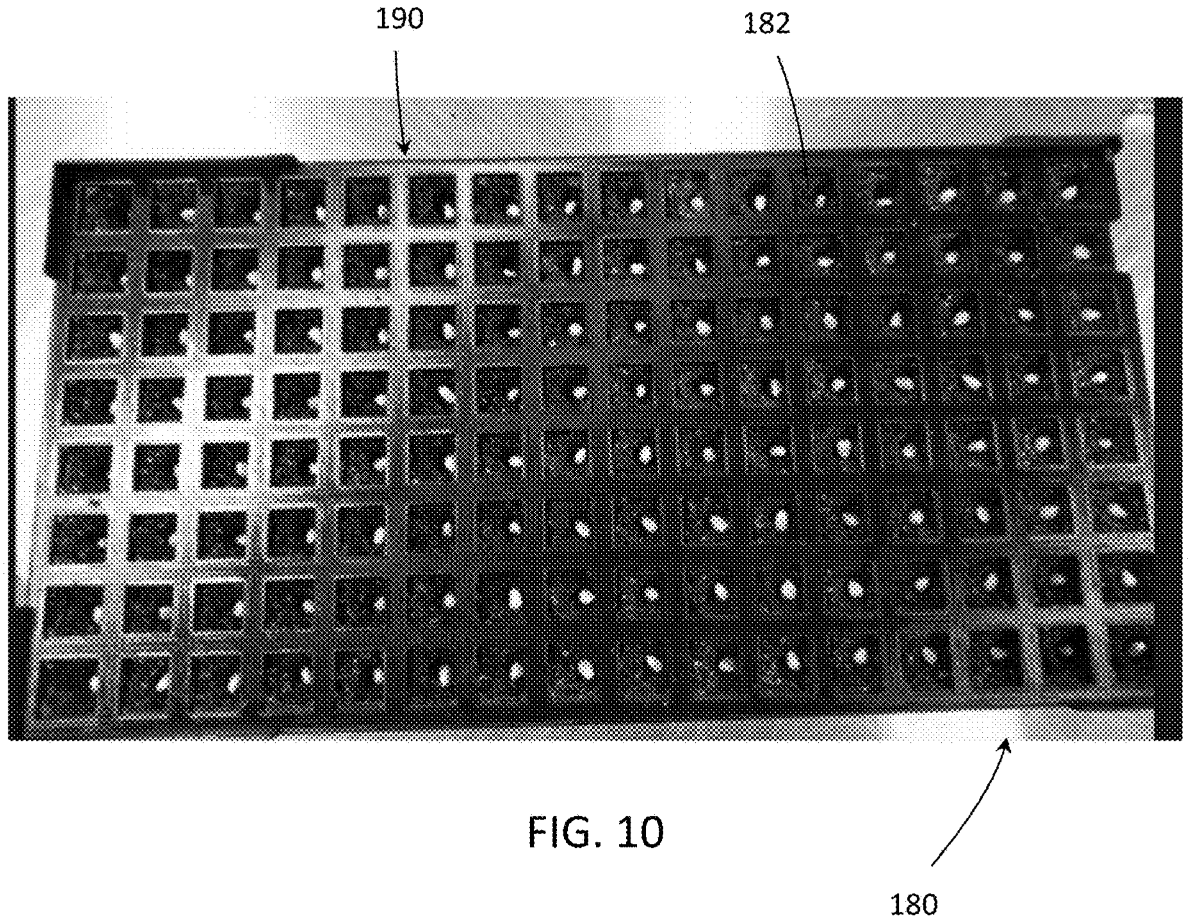
FIG. 10 is a perspective view of a template for use in transferring seeds from the tray assembly of FIG. 1 to the germination tray of FIG. 9, with the template shown positioned on the germination tray and with seeds shown planted in wells of the germination tray.

Following the second incubation period, the seeds in the priming tray 102 are transferred to a germination tray 180 for germination and subsequent analysis (again, while maintaining single seed identity of the seeds). For instance, as generally shown in FIG. 9, the priming tray 102 may be positioned over the germination tray 180 so that the wells 108 of the priming tray 102 align with wells 182 of the germination tray 180 (e.g., to thereby help maintain the single seed identity of the seeds as they are transferred from the priming tray 102 to the germination tray 180, etc.). The second divider 118 is actuated (e.g., the locking pins 130 are depressed to allow sliding movement of the divider 118, etc.) and moved to the open position, to align the cutout openings 120 with the wells 108 of the priming tray 102. And, in response, the seeds in the wells 108 of the priming tray 102 are released into the corresponding (aligned) wells 182 of the germination tray 180. The wells 182 of the germination tray 180 may include desired growth media to facilitate germination and growth of the seeds. As such, in this manner, the seeds are planted in the germination tray 180 via the priming tray 102. In some example embodiments, a guide or template (e.g., template 190 of FIG. 10, etc.) may be provided between the priming tray 102 and the germination tray 180 to help facilitate the alignment of the wells 108 of the priming tray 102 with the wells 182 of the germination tray 180 (and to help direct the seeds from the priming tray 102 into the germination tray 180).

The parts of the tray assembly 100 described above may be constructed from suitable material. For instance, in one example, the staging tray 104 and the priming tray 102 may be constructed from high density polyethylene (HDPE) and the dividers 116, 118 may be constructed from clear polycarbonate (e.g., so that the seeds may be viewed when in the wells 108 of the priming tray 102, etc.). In addition, the tray assembly 100 may have desired sizes. For instance, in one example embodiment, the priming tray 102 has a length dimension of about 26.5 inches and a width dimension of about 13.4 inches, for instance, to generally match a size of the germination tray 180. What's more, the tray assembly may include any desired number of openings 106 and/or wells 108, with the openings and wells generally aligning. In one example, the tray assembly 100 includes 128 openings 106 and 128 wells 108, for instance, to generally match a number of wells 182 in the germination tray 180.

Figure 11:
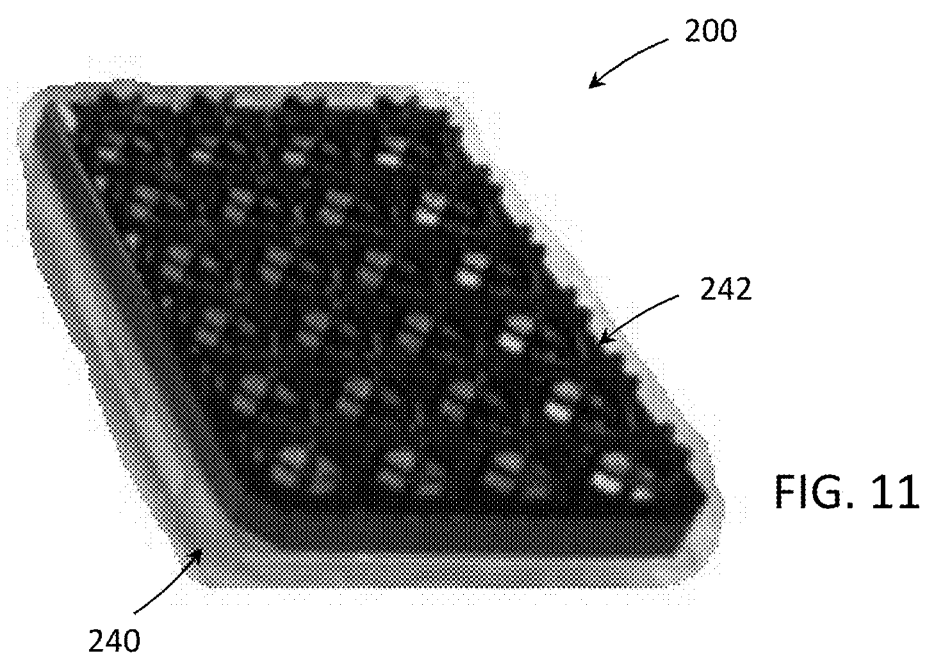
FIG. 11 is a perspective view of another example embodiment of a tray assembly of the present disclosure.
Figure 12:
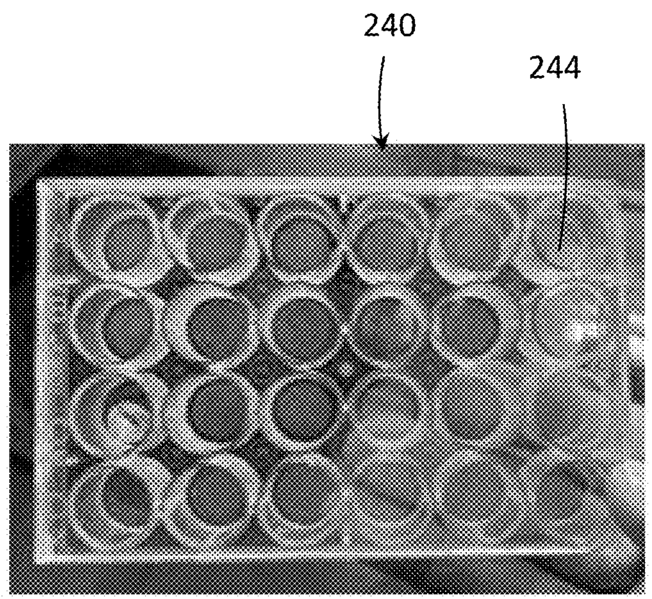
FIG. 12 is a perspective view of a seed tray of the tray assembly of FIG. 11.
Figure 13:
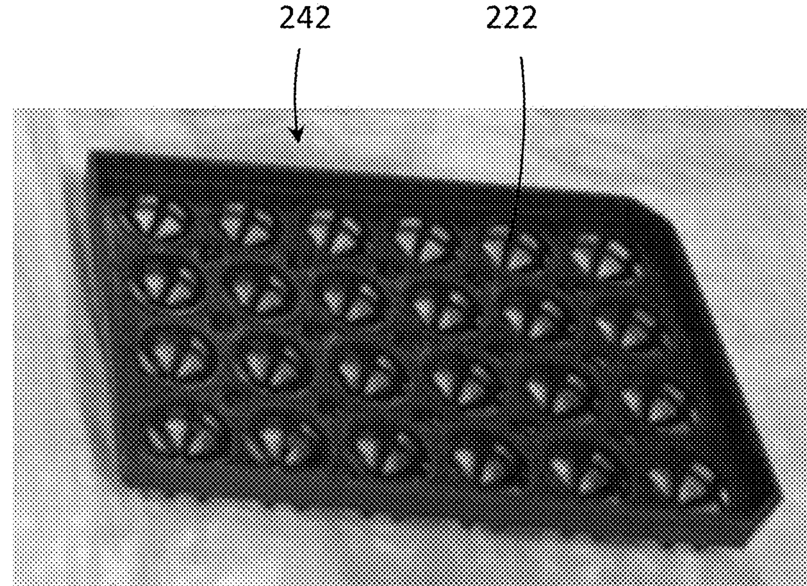
FIG. 13 is a perspective view of a cover of the tray assembly of FIG. 11.

FIGS. 11-13 illustrate another example embodiment of a tray assembly 200 including one or more aspects of the present disclosure. The tray assembly 200 may be used in connection with or without the automated priming and planting of seeds.

In this example embodiment, the tray assembly 200 includes a seed tray 240 (e.g., a seed plate, and O-plate, etc.) and a cover 242 configured to be disposed, positioned, located, etc. generally on (or above or over) the seed tray 240. The cover 242 is configured to be removably positioned over the seed tray 240, such that the cover 242 may be removed from the seed tray as desired (see, e.g., FIGS. 12 and 13, etc.). In connection therewith, the cover 242 may be configured to couple to the seed tray by a snap fit connection or friction connection, for instance, to facilitate the removable connection.

The seed tray 240 is configured to receive seeds into the tray assembly 200. For example, the seed tray 240 includes multiple wells 244. And, each of the wells 244 is configured to receive a single seed in the seed tray 240. The cover 242, then, includes multiple perforated openings 222 configured to align with the wells 244 of the seed tray 240 when the cover 242 is positioned on the seed tray. In some embodiments, the seed tray 240 can be further secured with the cover 242, for example, by bands, clips, other fasteners, etc.

In use of the tray assembly 200 of this embodiment, seeds are initially positioned in the wells 244 of the seed tray 240 (e.g., via an automated placement device, manually, etc.). Once the appropriate seeds are included in the wells 244 of the seed tray 240, the cover 242 is coupled to the seed tray 240. The tray assembly 200 is then positioned within a container (e.g., a storage unit, etc.) filled with a desired priming fluid (e.g., an oxidate solution, etc.) and incubated in the priming fluid for a desired period of time. Once the seeds are incubated in the priming fluid for the desired period of time, the tray assembly 200 is removed from the container, the priming fluid is drained from the priming tray (via the perforated openings 222 of the cover 242 which allow the priming fluid to drain from the wells 244 but retain the seeds in the wells 244), and the seeds are then dried while in the tray assembly 200 (e.g., via forced air, compressed air, etc.). Such drying, in this example, helps inhibit the seeds from sticking in the wells 244 of the seed tray 240, for example, during subsequent removal of the seeds for planting. Once the seeds are dry, the seeds in the tray assembly 200 are incubated once again for another period of time. And, following the second incubation period, the cover 242 is removed from the seed tray 240 and the seed tray 240 is transferred to an automated seed planting system (e.g., such as the system described in Applicant's U.S. Pat. Appl. Publ. 2020/0000007, etc.), in which the seeds are removed from the wells 244 of the seed tray 240 (e.g., by automated robots, etc.) and planted in a germination tray.

Figure 14:
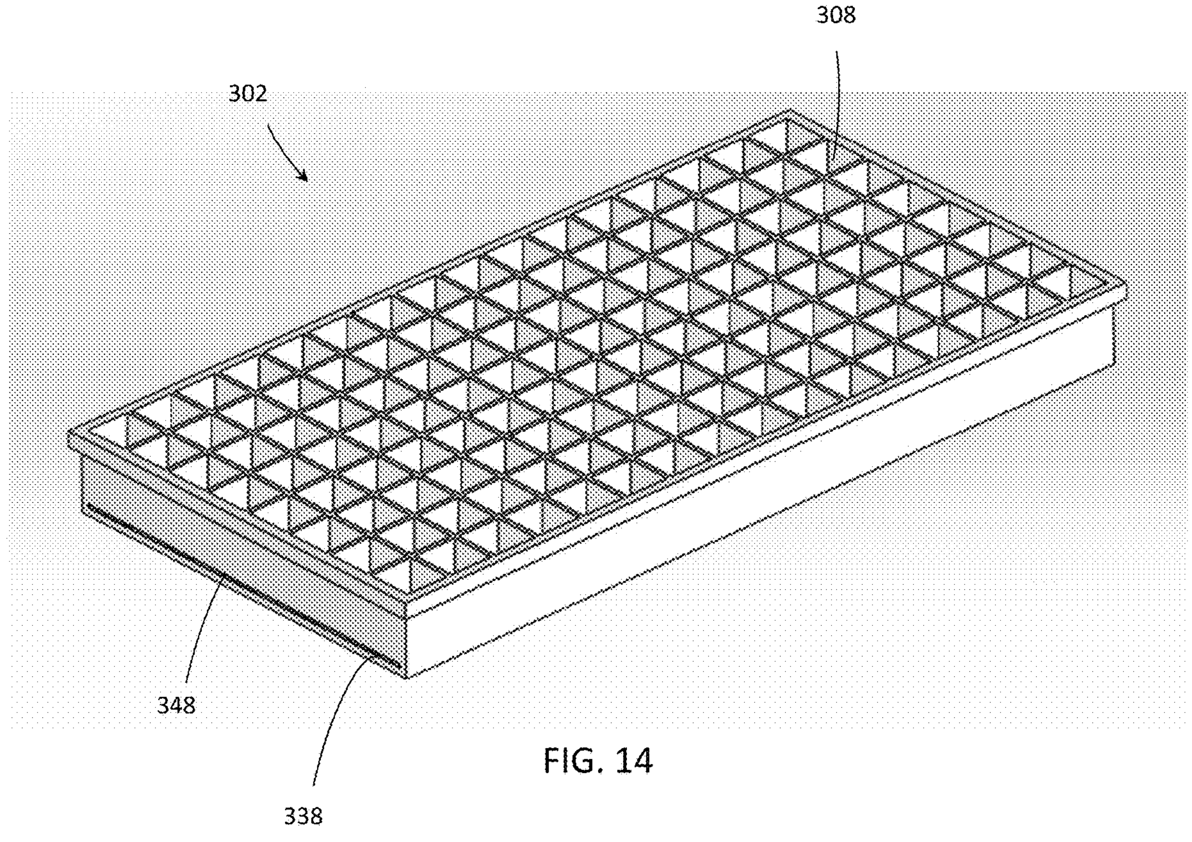
FIGS. 14 and 15 are perspective views of another example embodiment of a seed tray assembly of the present disclosure, including a seed tray (FIG. 14) and a treatment container (FIG. 15) in which the seed tray may be positioned.
Figure 15:
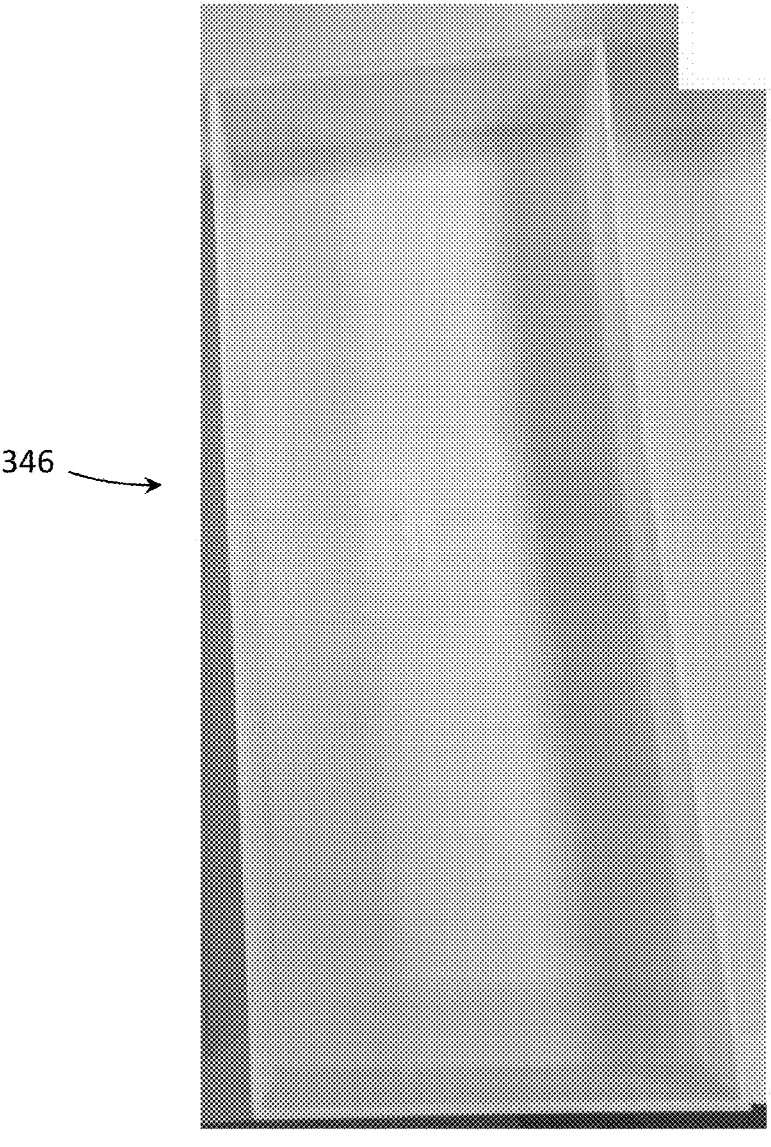

FIGS. 14 and 15 illustrate another example embodiment of a tray assembly including one or more aspects of the present disclosure. The tray assembly may be used in connection with the automated priming and planting of seeds.

In this example embodiment, the tray assembly generally includes a treatment container 346 (FIG. 15) and a seed tray 302 (FIG. 14) configured to be removably positioned within the treatment container 346. The seed tray 302 is configured to receive seeds into the tray assembly 300, for example, from an automated seed placement system (e.g., the system 150 described above in a similar manner to that described for the tray assembly 100, etc.). In connection therewith, the seed tray 302 includes multiple wells 308 that extend through the seed tray 302. And, each of the wells 308 is configured to receive a single seed therein from the automated seed placement system.

The tray assembly 300 also includes a perforated divider 348 (e.g., a mesh divider, etc.) positioned within a lower portion of the seed tray 302. The divider 348 is configured to selectively retain the seeds received in the seed tray 302 within the wells 308, or release the seeds therefrom. The divider 348 is moveably positioned within a slot 338 of the seed tray 302. As such, as desired, an end portion of the divider may be grasped to thereby remove (e.g., slide, etc.) the divider 348 out of the slot 338 of the seed tray 302 as desired (e.g., to allow the seeds in the wells 308 of the seed tray 302 to exit the wells 308, etc.) (e.g., the divider 348 is moveable between a closed (or locking) position in which the seeds are held in the wells 308 of the seed tray 302 and an open position in which the seeds are allowed to exit the wells 308 of the seed tray 302, etc.).

As indicated above, the tray assembly 300 is configured for use with an automated seed placement system, such as the system 150 described above, in a similar manner to the tray assembly 100 of FIGS. 1-6. In connection with such use, the divider 348 is positioned within the slot 338 of the seed tray (in the closed or locking position), and the seed tray 302 is positioned within the treatment container 346. The tray assembly 300 is then positioned for access in the seed placement system (e.g., system 150), for example, in a cart of a tray loading station (e.g., station 154 of system 150, etc.), etc. In operation of the automated seed placement system, then, seeds are positioned in the wells 308 of the seed tray 302 in the same manner described above.

Once the appropriate seeds are included in the wells 308 of the seed tray 302, the tray assembly 300 is removed from the automated seed placement system and collected for seed priming. In doing so, the treatment container 346 is filled with a desired priming fluid (e.g., an oxidate solution, etc.) and the tray assembly 300 is incubated in the priming fluid (in the container 346) for a desired period of time. Once the seeds are incubated in the priming fluid for the desired period of time, the seed tray 302 is removed from the treatment container 346, the priming fluid is drained from the seed tray 302 (via the perforated divider 348), and the seeds (in the seed tray 302) are incubated once again for another period of time. In this example embodiment, because the perforated divider 348 is aligned with the wells 308 of the seed tray 302, the priming fluid readily drains from the wells 308 when the seed tray 302 is removed from the treatment container. As such, in this example embodiment, additional (active) drying of the seeds (e.g., via compressed air, etc.) is not required prior to further incubation of the seeds.

Following the second incubation period, the seeds in the seed tray 302 are transferred to a germination tray (e.g., germination tray 180, etc.) for germination and subsequent analysis. For instance, the seed tray 302 may be positioned over the germination tray so that the wells 308 of the seed tray 302 align with wells of the germination tray. The divider 348 is actuated and removed from the seed tray 302 (e.g., moved from the closed position to the open position, etc.) and, in response, the seeds in the wells 308 of the seed tray 302 are released into the corresponding (aligned) wells of the germination tray. The wells of the germination tray may include desired growth media to facilitate germination and growth of the seeds. As such, in this manner, the seeds are planted in the germination tray via the seed tray 302.

Figure 16:
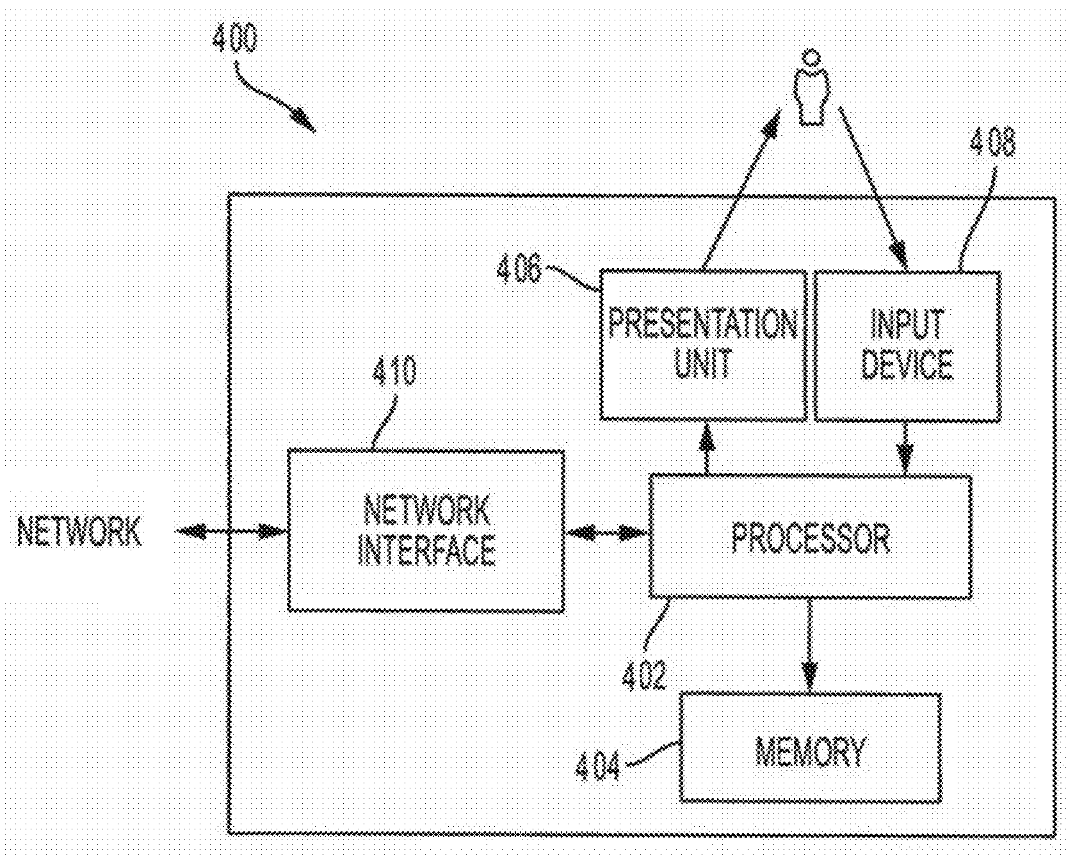
FIG. 16 is a block diagram of an example computing device that may be used in the automated seed placement system of FIG. 7.

FIG. 16 illustrates an example computing device 400 that can be used in connection with the seed placement system 150. The computing device 400 may include, for example, one or more servers, workstations, personal computers, laptops, tablets, smartphones, etc. In addition, the computing device 400 may include a single computing device, or it may include multiple computing devices located in close proximity or distributed over a geographic region, so long as the computing devices are specifically configured to function as described herein. In the example embodiment of FIG. 7, each of the robots 156, 173 and the controller 170 may be considered as including and/or being implemented in at least one computing device consistent with computing device 400. However, the present disclosure should not be considered to be limited to the computing device 400, as described below, as different computing devices and/or arrangements of computing devices and/or arrangement of components associated with such computing devices may be used.

Referring to FIG. 16, the example computing device 400 includes a processor 402 and a memory 404 coupled to (and in communication with) the processor 402. The processor 402 may include one or more processing units (e.g., in a multi-core configuration, etc.). For example, the processor 402 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 404, as described herein, is one or more devices that permit data, instructions, etc., to be stored therein and retrieved therefrom. The memory 404 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 404 may be configured to store, without limitation, the various data (and/or corresponding data structures) described herein. Furthermore, in various embodiments, computer-executable instructions may be stored in the memory 404 for execution by the processor 402 to cause the processor 402 to perform one or more of the functions described herein, such that the memory 404 is a physical, tangible, and non-transitory computer readable storage media. Such instructions often improve the efficiencies and/or performance of the processor 402 and/or other computer system components configured to perform one or more of the various operations herein. It should be appreciated that the memory 404 may include a variety of different memories, each implemented in one or more of the functions or processes described herein.

The computing device 400 also includes a presentation unit 406 that is coupled to (and is in communication with) the processor 402 (however, it should be appreciated that the computing device 400 could include output devices other than the presentation unit 406, etc.). The presentation unit 406 outputs information to users of the computing device 400 as desired. And, various interfaces (e.g., as defined by network-based applications, etc.) may be displayed at computing device 400, and in particular at presentation unit 406, to display such information. The presentation unit 406 may include, without limitation, a liquid crystal display (LCD), a light-emitting diode (LED) display, an organic LED (OLED) display, an "electronic ink" display, speakers, etc. In some embodiments, the presentation unit 406 may include multiple devices.

In addition, the computing device 400 includes an input device 408 that receives inputs from the users of the computing device 400. The input device 408 may include a single input device or multiple input devices. The input device 408 is coupled to (and is in communication with) the processor 402 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both a presentation unit and an input device.

Further, the illustrated computing device 400 also includes a network interface 410 coupled to (and in communication with) the processor 402 and the memory 404. The network interface 410 may include, without limitation, a wired network adapter, a wireless network adapter, a mobile network adapter, or other device capable of communicating to one or more different networks. Further, in some example embodiments, the computing device 400 may include the processor 402 and one or more network interfaces incorporated into or with the processor 402.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for treating and planting batches of seeds, the method comprising:

positioning multiple seeds in a tray assembly via a seed planting system including:

positioning the seeds in openings of a staging tray of the tray assembly, such that each opening includes one seed; and actuating a first divider of the tray assembly to release the seeds from the openings of the staging tray to aligned wells of a holding tray, by moving perforated openings of the first divider out of alignment with each of the openings of the staging tray to thereby allow the seeds to move from the openings of the staging tray to the wells of the holding tray;

after positioning the multiple seeds in the tray assembly, treating the seeds with a treatment fluid while the seeds are in the tray assembly; and then transferring the seeds from the tray assembly to a germination tray, thereby planting the seeds in the germination tray, while maintaining single seed identity of the seeds from the tray assembly to the germination tray.

2. The method of claim 1, wherein treating the seeds with the treatment fluid includes soaking the seeds in the treatment fluid while the seeds are in the tray assembly, and wherein the treatment fluid includes one or more of water, a priming solution, a bio-stimulant solution, a nutrient solution, and/or a biocontrol solution.

3. The method of claim 1, wherein treating the seeds with the treatment fluid while the seeds are in the tray assembly includes treating the seeds with the treatment fluid after the seeds are released to the wells of the holding tray and while the seeds are in the holding tray.

4. The method of claim 3, further comprising, after treating the seeds, draining the treatment fluid from the wells of the holding tray through the perforated openings of the first divider located generally above the holding tray and aligned with the wells of the holding tray and/or through perforated openings of a second divider located generally below the holding tray and aligned with the wells of the holding tray.

5. The method of claim 4, further comprising actuating the second divider to release the seeds from the wells of the holding tray to aligned wells of a germination tray, by moving the perforated openings of the second divider out of alignment with each of the wells of the holding tray to thereby allow the seeds to move from the wells of the holding tray to the aligned wells of the germination tray, wherein single seed identity of the seeds is maintained as the seeds move from the wells of the holding tray to the wells of the germination tray.

6. The method of claim 5, further comprising growing the seeds in the germination tray.

7. The method of claim 1, wherein treating the seeds includes soaking the seeds with a priming fluid.

8. The method of claim 7, wherein soaking the seeds with the priming fluid includes submerging at least part of the tray assembly in the priming fluid.

* * * * *